(12) United States Patent
Lin

(10) Patent No.: US 8,094,257 B2
(45) Date of Patent: Jan. 10, 2012

(54) LIQUID CRYSTAL MODULE

(75) Inventor: Ke-Feng Lin, Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 12/700,741

(22) Filed: Feb. 5, 2010

(65) Prior Publication Data

US 2011/0194046 A1    Aug. 11, 2011

(51) Int. Cl.
*G02F 1/1333*    (2006.01)
(52) U.S. Cl. .......................................... 349/58; 349/150
(58) Field of Classification Search ........................ None
See application file for complete search history.

(56) References Cited

U.S. PATENT DOCUMENTS

2007/0013824 A1 *   1/2007   Yu et al. ........................... 349/58
2007/0146570 A1 *   6/2007   Yu et al. ........................... 349/58

* cited by examiner

*Primary Examiner* — Richard Kim

(57) ABSTRACT

A liquid crystal module includes a base frame which has a retaining space, two opposite end rims and two opposite side rims surrounding around the retaining space, a backlight panel and a display panel mounted in the retaining space. A top surface of the side rims defines at least one fastening fillister of which a top of a rear wall protrudes forward to form a fastening arm. A front end of the fastening arm protrudes downward to form a buckling portion. A flexible circuit board electrically connects the backlight panel, the display panel and an external circuit, and has a base board of which two opposite ends are mounted to the side rims. At least one fastening strip is formed at the two opposite ends of the base board and stretches into the fastening fillister. A buckling hole is opened in the fastening strip for buckling the buckling portion.

4 Claims, 3 Drawing Sheets

LIQUID CRYSTAL MODULE

BACKGROUND OF THE INVENTION

1. Field of the Invention

The present invention relates to a liquid crystal module, and more particularly to a liquid crystal module having a fixing structure.

2. The Related Art

A conventional liquid crystal module includes a base frame, a backlight panel, a display panel and a flexible circuit board mounted to the base frame respectively. The base frame defines a retaining space for receiving the backlight panel and the display panel therein. The display panel is further mounted under the backlight panel. The flexible circuit board has a first contact portion electrically connecting the backlight panel and the display panel, a second contact portion electrically connecting an external circuit, and a base board connecting the first and the second contact portions. The base board of the flexible circuit board is covered on the backlight panel by means of two opposite ends thereof being glued to two opposite sides of the base frame by twin adhesive and without any other fixing structures. As a result, the flexible circuit board is apt to fall off the base frame under a restoring force when the base board is accidentally bent.

Another method of mounting the flexible circuit board to the base frame is achieved by means of providing an additional fixing board on the base frame, and then gluing one edge of the base board of the flexible circuit board to the fixing board. However, the thickness of the fixing board increases the thickness of the liquid crystal module. Therefore, a liquid crystal module capable of overcoming the foregoing problems is required.

SUMMARY OF THE INVENTION

An object of the present invention is to provide a liquid crystal module which includes a base frame having a retaining space, a backlight panel mounted in the retaining space of the base frame, a display panel mounted in the retaining space of the base frame under the backlight panel, and a flexible circuit board. The base frame further has two opposite end rims and two opposite side rims surrounding around the retaining space. A top surface of the side rims of the base frame defines at least one fastening fillister. A top of a rear wall of the fastening fillister protrudes forward into the fastening fillister to form a fastening arm. A front end of the fastening arm protrudes downward to form a buckling portion spaced from a bottom surface of the fastening fillister. The flexible circuit board has a first contact portion electrically connecting the backlight panel and the display panel, a second contact portion electrically connecting an external circuit, and a base board connecting the first and the second contact portions. Two opposite ends of the base board are mounted to the side rims of the base frame respectively to make the base board covered onto the backlight panel. At least one fastening strip is formed at the two opposite ends of the base board and stretches into the corresponding fastening fillister under the corresponding fastening arm. A buckling hole is opened in the fastening strip for buckling the buckling portion so as to ensure a firm assembly between the flexible circuit board and the base frame.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
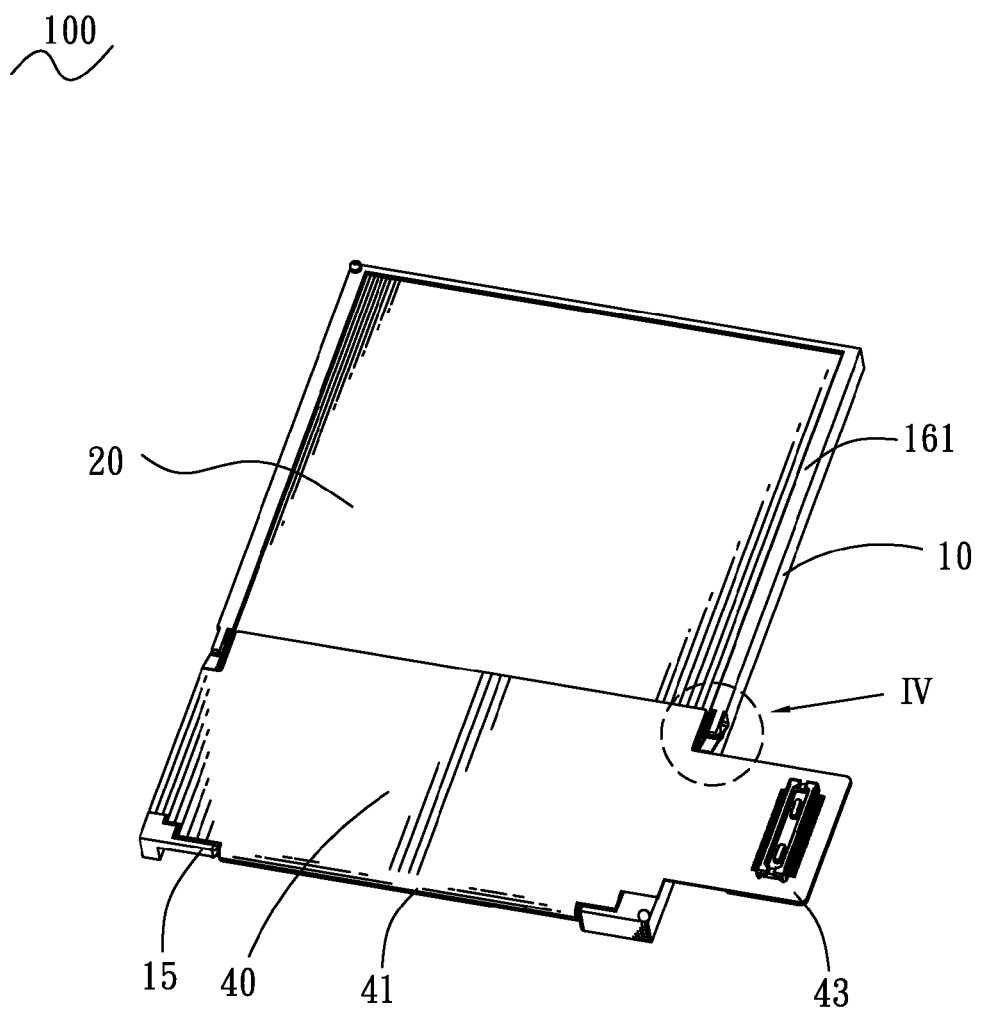
FIG. 1 is a perspective view of a liquid crystal module according to the present invention.
Figure 2:
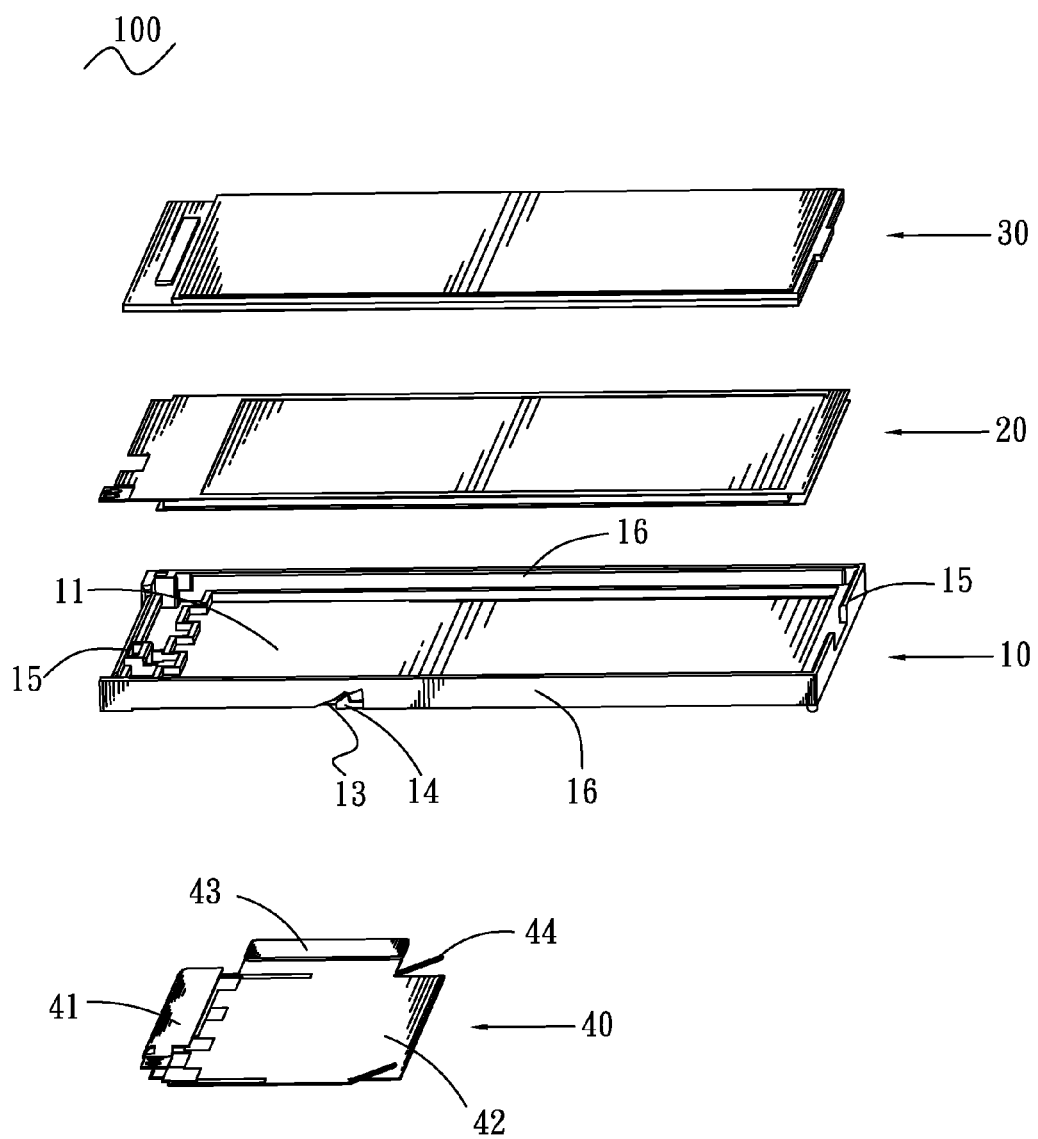
FIG. 2 is an exploded view of the liquid crystal module of FIG. 1.

Referring to FIG. 1 and FIG. 2, a liquid crystal module 100 according to the present invention includes a base frame 10, a backlight panel 20, a display panel 30 and a flexible circuit board 40 mounted to the base frame 10 respectively.

Figure 3:
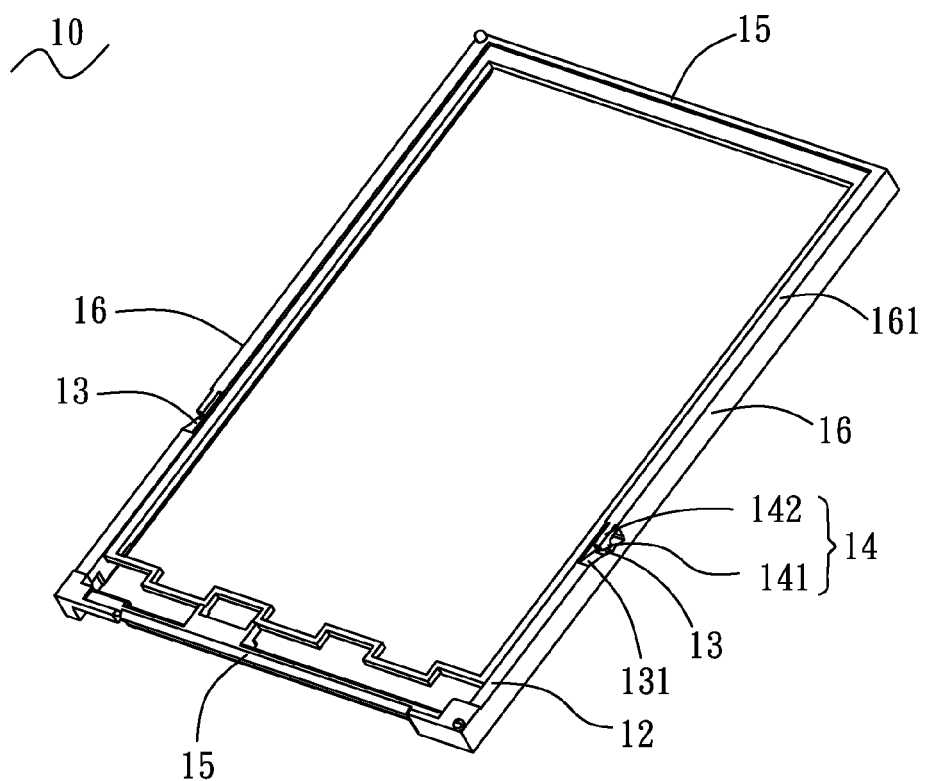
FIG. 3 is a perspective view of a base frame of the liquid crystal module of FIG. 1.

Referring to FIG. 2 and FIG. 3, the base frame 10 is a rectangular circle with two opposite end rims 15 and two opposite side rims 16 extended along a longwise direction thereof respectively. Accordingly, a rectangular retaining space 11 is surrounded by the ends rims 15 and the side rims 16. A front of a top surface 161 of each side rim 16 is concaved downward to form a retaining cavity 12 along a longwise direction thereof and a fastening fillister 13 behind the retaining cavity 12. The fastening fillister 13 has a deeper depth than the retaining cavity 12 and communicates with the retaining cavity 12 with a bottom surface 131 gradually inclined upward from a rear to a front thereof to be connected with a bottom surface of the retaining cavity 12. A top of a rear wall of each fastening fillister 13 protrudes forward into the fastening fillister 13 to form a fastening arm 142. A front end of the fastening arm 142 protrudes downward to form a buckling portion 141 spaced from the bottom surface 131 of the fastening fillister 13. The fastening arm 142 and the corresponding buckling portion 141 are together defined as a first fixing structure 14.

Referring to FIG. 1, the backlight panel 20 is mounted in the retaining space 11 of the base frame 10. The display panel 30 is also mounted in the retaining space 11 of the base frame 10 and further fastened under the backlight panel 20.

Figure 4:
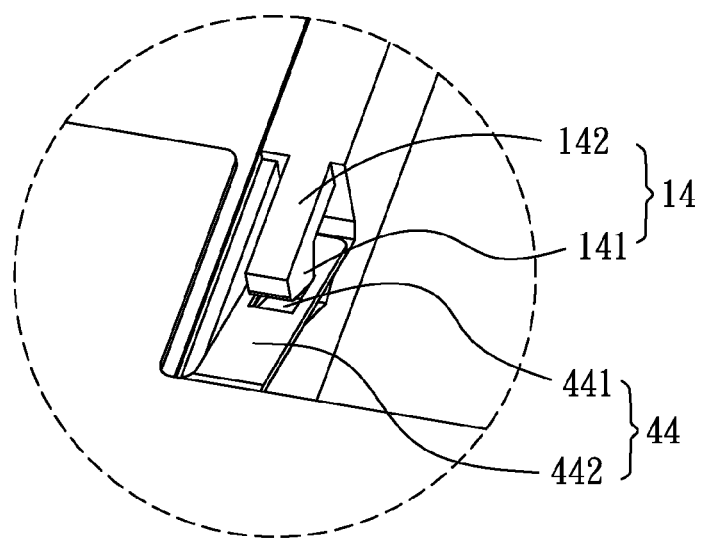
FIG. 4 is an enlarged view of an encircled portion IV of FIG. 1.

Referring to FIG. 1, FIG. 2 and FIG. 4, the flexible circuit board 40 has a substantially rectangular base board 42 which is covered on a front of the backlight panel 20 at the same level with the top surfaces 161 of the side rims 16 of the base frame 10. Two opposite ends of the base board 42 are buckled in the retaining cavities 12 of the base frame 10 respectively. A front edge of the base board 42 extends forward and then is bent rearward to form a first contact portion 41 which wraps a middle portion of a front end rim 15 of the base frame 10 and abuts under the display panel 30. Two ends of the first contact portion 41 are further glued to the backlight panel 20 and the display panel 30 so as to form an electrical connection with the backlight panel 20 and the display panel 30. Each rear portion of the two opposite ends of the base board 42 is provided with a fastening strip 442 freely inclined downward to stretch into the corresponding fastening fillister 13 along the bottom surface 131 of the fastening fillister 13 and under the fastening arm 142. A buckling hole 441 is opened in the fastening strip 442, and the buckling portion 141 of the first fixing structure 14 is buckled in the buckling hole 441 to ensure a firm assembly between the flexible circuit board 40 and the base frame 10. The fastening strip 442 and the buckling hole 441 are together defined as a second fixing structure 44. One end of the base board 42 further extends sideward to form a second contact portion 43 for electrically connecting with an external circuit (not shown).

As described above, the liquid crystal module 100 of the present invention can make the flexible circuit board 40 firmly mounted to the base frame 10 by means of the buckling between the first fixing structure 14 of the base fame 10 and the second fixing structure 44 of the flexible circuit board 40. Furthermore, the base board 42 of the flexible circuit board 40 is covered on the front of the backlight panel 20 at the same level with the top surfaces 161 of the side rims 16 of the base frame 10. Thus, it can reduce a whole thickness of the liquid crystal module 100.

What is claimed is:

1. A liquid crystal module, comprising:
a base frame having a retaining space, two opposite end rims and two opposite side rims surrounding around the retaining space, a top surface of the side rims of the base frame defining at least one fastening fillister, a top of a rear wall of the fastening fillister protruding forward into the fastening fillister to form a fastening arm, a front end of the fastening arm protruding downward to form a buckling portion spaced from a bottom surface of the fastening fillister;
a backlight panel mounted in the retaining space of the base frame;
a display panel mounted in the retaining space of the base frame under the backlight panel; and
a flexible circuit board having a first contact portion electrically connecting the backlight panel and the display panel, a second contact portion electrically connecting an external circuit, and a base board connecting the first and the second contact portions, two opposite ends of the base board being mounted to the side rims of the base frame respectively to make the base board covered onto the backlight panel, at least one fastening strip being formed at the two opposite ends of the base board and stretching into the corresponding fastening fillister under the corresponding fastening arm, a buckling hole being opened in the fastening strip for buckling the buckling portion.

2. The liquid crystal module as claimed in claim 1, wherein the bottom surface of the fastening fillister is inclined upward from a rear to a front thereof, the fastening strip is freely inclined downward from a front to a rear thereof to stretch into the corresponding fastening fillister along the bottom surface of the fastening fillister.

3. The liquid crystal module as claimed in claim 1, wherein the top surface of each side rim of the base frame further defines a long retaining cavity, the two opposite ends of the base board of the flexible circuit board are buckled in the retaining cavities respectively to make the base board covered on the backlight panel at the same level with the top surfaces of the side rims of the base frame.

4. The liquid crystal module as claimed in claim 3, wherein a front edge of the base board extends forward and then is bent rearward to form the first contact portion which wraps one end rim of the base frame and abuts under the display panel, two ends of the first contact portion are further electrically glued to the backlight panel and the display panel.

\* \* \* \* \*